Patented Apr. 15, 1952

2,593,057

UNITED STATES PATENT OFFICE 2,593,057

INHIBITORS AGAINST HYDROGEN SULFIDE AND BRINE CORROSION

Michael G. Savoy, Chicago, Ill., assignor to The Pure Oil Company, Chicago, Ill., a corporation of Ohio No Drawing. Application December 29, 1949, Serial No. 135,845

4 Claims. (Cl. 252—8.55)

This invention relates to a method of protecting metal equipment against the corrosive action of hydrogen sulfide and relates particularly to the prevention of the corrosion of metal parts within underground formations producing sour crudes which corrode the metal parts.

It is an object of this invention to protect oil well casing and tubing and related metal parts from the corrosive action of hydrogen sulfide.

It is a second object of this invention to protect the sucker rods and pumps used in oil wells against the corrosion of hydrogen sulfide.

It is a third object of this invention to protect metal parts, conduits and machinery of an oil well or related processing equipment from corrosion by hydrogen sulfide and brine solutions.

It is a fourth object of this invention to greatly improve the economy and efficiency of oil well drilling operations and producing operations by creating a reduction of the corrosive action of hydrogen sulfide and brine solutions on the metal parts and machinery used in such operations.

Other objects and advantages of this invention will in part become obvious, and in part appear from the detailed description which follows.

It has been discovered that hydrogen sulfide and brine corrosion of the metal parts buried within earth formations of an oil well can be prevented to a very substantial degree by the presence of inhibitors in the form of cellulose derivatives in the well bore. The most active inhibitors are those cellulose derivatives containing a carboxymethyl grouping, as carboxymethyl cellulose, especially alkali metal salts of carboxymethyl cellulose and the sulfate of carboxymethyl cellulose. It is not known just how these inhibitors function to stop the sulfide and brine corrosion and this invention is not limited to any theories of inhibition which may apply. It is possible that these cellulose inhibitors may become adsorbed on the metal surfaces or react with the metal itself to form a protective film or coating through which the hydrogen sulfide and brine cannot penetrate. The inhibitors may function to tie up any corrosion ions present in a form which will not attack the metals or the mere presence of the inhibitors may change the galvanic characteristics of the brine and hydrogen sulfide solution to a point where there is no attack on the metal parts.

Cellulose derivatives of the type used herein and of related types have been used in drilling muds for the purpose of preventing water loss therefrom. The addition of sodium carboxymethyl cellulose to clay containing drilling fluids has been shown to cause an increase in viscosity of the drilling fluid and brings about appreciable reductions of water loss and changes in gel strength. Since on completion of the drilling operation, all drilling fluid is removed from the well bore before production is begun, the sodium carboxymethyl cellulose once present will not be there to function against corrosion when the crude oil or hydrogen sulfide containing gases are produced.

Briefly, the method of protecting metal surfaces in oil wells comprises the step of injecting a prepared solution of the cellulose derivative into contact with the casing wall and tubing wall and allowing it to coat the entire surface thereof and pumping the inhibitor solution along with the sour crude oil, the brine and hydrogen sulfide from the well. This injection may be accomplished from the surface of the well in a manner such as to thoroughly contact those surfaces which will come in contact with the corrosive fluids, by allowing the prepared solution of inhibitor to flow downwardly through the casing.

In the production of sour crudes such as those emanating from West Texas and Worland, Wyoming oil fields there is attendant the evolution of considerable quantities of hydrogen sulfide which has an extremely corrosive action on all metal surfaces with which it contacts. Many of such crudes are accompanied by brine solutions which serve to increase the corrosion problems. Complete failure of some metal parts in comparatively short periods of time is often experienced requiring costly replacements and delay in production.

Generally the proportion of brine produced will increase as the quantity of oil diminishes in the well and this serves to further increase the corrosion rate. The fluids produced from some wells become so corrosive, due to their hydrogen sulfide content and increased brine content over the course of years of production, that it becomes uneconomical to continue pumping them. For these reasons, investigators have long sought a means of preventing the corrosion of metal parts in such wells. Aqueous solutions of formaldehyde have been found by some investigators to be effective in controlling corrosion due to hydrogen sulfide. Generally, the amount of formaldehyde needed is proportional to the rate of withdrawal of the crude and brine from the well. Approximately one quart of formaldehyde solution per 100 barrels of brine produced has been found generally effective.

The corrosion inhibitors of the present invention, namely, sodium carboxymethyl cellulose and cellulose sulfate are effective when present in a ratio of about 1 part of active inhibitor to 10,000 parts of brine. For example, about 1 gallon of 25 percent aqueous or alcoholic solution of the inhibitor is used per 100 barrels of brine or crude issuing from the well.

In order to demonstrate the effectiveness of the corrosion inhibiting compounds of the present invention, the following experiments were run.

*Example 1.*—To ascertain the relative protective value of cellulose derivatives for steel when exposed to corrosive conditions duplicating as nearly as possible the conditions within a well bore, the following technique was employed:

A cold rolled steel rod ¼ inch in diameter and 4 inches long was sandblasted, cleaned and weighed and placed in a large test tube. 63 cubic centimeters of oil well brine saturated with hydrogen sulfide was added to the test tube together with one part in one thousand parts by weight of sodium carboxymethyl cellulose. The liquid system was then frozen and evacuated followed by thawing to exclude all air. The thawed mixture was then saturated with hydrogen sulfide by bubbling a slow stream of the gas through the liquid in the tube for five minutes. The tube was then set aside at room temperature for about 30 days. After this time, the tube was opened and the steel rod removed. The rod was washed clean with acetone followed by a thorough water rinse, then it was dipped in a 1 percent hydrochloric acid solution for removal of sulfides from the surface. On removal from the acid bath the rod was thoroughly washed with water again and dried. A determination of the weight loss was next made as an indication of the relative protection value of the inhibitor. Two runs were made with inhibitor and two without for comparison. The results are tabulated as follows:

TABLE I

| Test No. | Inhibitor | Duration of Test (Days) | Loss in Weight (Mg.) |
| --- | --- | --- | --- |
| 1 | NaCMC | 30 | 1.9 |
| 2 | NaCMC | 30 | 1.9 |
| 3 | None | 30 | 36.3 |
| 4 | do | 30 | 36.3 |

Since it is known that the rate of corrosion is greatly influenced by the strength and composition of the brine solution and also by the technique employed, a group of commercially available cellulose derivatives and other known inhibitors were tested with some slight variation in technique. Fourteen-day tests were carried out with 3 percent sodium chloride solutions and with synthetic Reed City, Michigan brine. Duplicate runs were made and averages reported. The technique was as follows:

*Example 2.*—A weighed strip of cold-rolled steel 3¼ inches long, ⅝ inch wide and ⅛ inch thick was suspended in a one-quart glass jar by means of a cord secured to the under side of the jar lid by Plicene cement, thereby enabling each test jar to be closed air tight and the test strip to be suspended in approximately the geometric center of the solution and jar. 800 cubic centimeters of the respective brine solutions were used in each test and 0.8 gram of the inhibitor used, thereby making the weight percent concentration of the inhibitor around 0.1. Hydrogen sulfide was passed through a fritted glass disk in the salt solutions in the jars for one-half hour to assure saturation. Then the weighed clean steel test strip was lowered into each jar and the lid placed tightly therein, a tight seal being formed by a rubber seal. All jars were immersed in a water bath at 80° to ±2° F. for the desired duration of time. The technique used in cleaning the steel test strips was first to wash the strips in acetone to remove all grease therefrom. This was followed by a short pickling operation in dilute hydrochloric acid to remove all scale. Finally the steel strips were rubbed with steel wool to a fine polished finish and carefully weighed. After immersion in the brine solutions the strips were removed and washed with water, wiped dry and then pickled in inhibited hydrochloric acid, then treated with an alcohol rinse, air dried and weighed. The steel strips, on completion of the treatment with brine solutions at about 80° F., all exhibited a gray and slightly etched surface. No pitting was observed except in those cases where an actual acceleration of corrosion was experienced. The results are tabulated as follows:

TABLE II

| No. | Inhibitor | Weight Loss in Milligrams 14 days | |
| --- | --- | --- | --- |
| | | Reed City Brine | 3% NaCl |
| 5 | None | 13.5 | 93.0 |
| 6 | MaCMC (grade 2) | 5.2 | 53.0 |
| 8 | Cellulose sulfate | 4.5 | 48.0 |
| 9 | Sulfoethyl cellulose | 8.0 | 69.0 |
| 10 | Hydroxyethyl cellulose | 9.3 | 97.0 |
| 11 | Carboxymethyl cellulose | 9.5 | 74.0 |
| 12 | Ethylcellulose | | 89.0 |
| 13 | Methylcellulose | | 107.0 |
| 14 | do | | 102.0 |
| 15 | Cellulose gum | | 65.0 |
| 16 | Pyridine | | 113.0 |
| 17 | K-Xanthate | | 192.0 |
| 18 | NaNH₄PO₄4H₂O | | 70.0 |

The results shown in Table II above indicate that the percent of sodium chloride present in the brine somewhat effects the corrosion rate and the ability of the various inhibitors to reduce the corrosion. The Reed City brine represents a brine solution comparable to the type of brines found generally in brine producing wells.

The composition of the synthetic Reed City brine is as follows: (the pH was adjusted with hydrochloric acid and determined with the use of a glass electrode).

TABLE III

*Composition of synthetic Reed City brine*

Weight percent

| | |
| --- | --- |
| NaCl | 7 |
| CaCl₂ | 2.5 |
| MgCl₂ | 0.4 |
| HCO₃ | 0.022 |
| pH | 6.0 |

Referring to Table II again, it is seen that sodium carboxymethyl cellulose and cellulose sulfate are more effective than the other inhibitors tested, especially in the Reed City brine. Considering the tremendous losses due to corrosion of machinery, pump rods, and the like during the production of corrosive crudes and corrosive gases, it is apparent that a substantial saving can be attained by the use of sodium carboxymethyl cellulose and cellulose sulfate as corrosion inhibitors.

The step from laboratory practice to actual field operations is a large one in most instances due to the difficulty of reproducing the field conditions in the laboratory. However, in the case of corrosion inhibition this is not generally true. The type of laboratory tests herein disclosed are commonly used to evaluate inhibitors before use in a well. The test conditions are more severe than those found in a well and it will be found that if an inhibitor functions in the laboratory tests, must better results will be attained when it is put to actual practice in the field. The tests also give an indication of just how much inhibitor need be added to gain the result desired, that amount being less in actual practice than is needed in the laboratory tests. No benefit is gained by using excessive quantities of inhibitor, and the amount found operable in the laboratory tests will be more than adequate for field practice.

It has been found that when the inhibitors of the present invention are present in a system containing corrosive brines or corrosive gases or both, in the proportions recommended, that the rate of corrosion of metal parts in contact with the brines is substantially reduced. This discovery, when applied to field practice, will result in materially reducing the corrosion of well parts in contact with such corrosive brines. This results in an overall improvement in the economy and efficiency of the production from the well.

It is apparent that many alterations can be made from the method herein described without departing from the scope and spirit of the invention. Any of these changes which are within the description and intent of this invention are merely illustrative thereof and are not to be interpreted in a limiting sense.

What is claimed is:

1. The method of protecting steel surfaces in oil wells against hydrogen sulfide and brine corrosion comprising continually introducing in said wells during the production of oil and brine therefrom, compounds selected from the group consisting of cellulose sulfate and alkali metal salts of carboxymethyl cellulose in an amount of about 1 part of said compounds per 1,000 to 10,000 parts of brine produced from the well, so that said compounds become mixed with said oil and brine in contact with said surfaces and withdrawing oil and brine from the well mixed with said compounds.

2. The method in accordance with claim 1 in which the compound is sodium carboxymethyl cellulose.

3. The method in accordance with claim 1 in which the compound is cellulose sulfate.

4. The method of protecting metal surfaces from corrosion by brine solutions containing hydrogen sulfide comprising contacting said surface with a brine solution containing a compound selected from the group consisting of cellulose sulfate and alkali metal salts of carboxymethyl cellulose in an amount of at least about 1 part per 10,000 parts of said brine solution and maintaining the concentration of said compound at said amount during the time said metal surfaces are in contact with said brine.

MICHAEL G. SAVOY.

REFERENCES CITED

The following references are of record in the file of this patent:

UNITED STATES PATENTS

| Number | Name | Date |
| --- | --- | --- |
| 2,425,768 | Wagner | Aug. 19, 1947 |
| 2,472,400 | Bond | June 7, 1949 |